United States Patent
Nagura et al.

(10) Patent No.: US 10,247,179 B2
(45) Date of Patent: Apr. 2, 2019

(54) GAS COMPRESSION DEVICE

(71) Applicant: Kobe Steel, Ltd., Hyogo (JP)

(72) Inventors: Kenji Nagura, Takasago (JP); Hitoshi Takagi, Takasago (JP); Takuro Uba, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 190 days.

(21) Appl. No.: 15/320,674

(22) PCT Filed: Jun. 4, 2015

(86) PCT No.: PCT/JP2015/066165
§ 371 (c)(1),
(2) Date: Dec. 20, 2016

(87) PCT Pub. No.: WO2015/198822
PCT Pub. Date: Dec. 30, 2015

(65) Prior Publication Data
US 2017/0146001 A1 May 25, 2017

(30) Foreign Application Priority Data
Jun. 27, 2014 (JP) ................. 2014-133006

(51) Int. Cl.
*F17C 5/06* (2006.01)
*F04B 35/01* (2006.01)
*F04B 35/04* (2006.01)
*F04B 39/12* (2006.01)
*F04B 41/02* (2006.01)
*F04B 41/06* (2006.01)
*F04B 53/10* (2006.01)

(52) U.S. Cl.
CPC ............. *F04B 41/02* (2013.01); *F04B 35/01* (2013.01); *F04B 35/04* (2013.01); *F04B 39/123* (2013.01); *F04B 41/06* (2013.01); *F04B 53/10* (2013.01); *F17C 5/06* (2013.01); *F04B 2201/0208* (2013.01); *Y02E 60/321* (2013.01)

(58) Field of Classification Search
CPC ........ F04B 41/02; F04B 53/10; F04B 39/123; F04B 35/01; F04B 41/06;
(Continued)

(56) References Cited

U.S. PATENT DOCUMENTS 4,273,514 A * 6/1981 Shore ...................... F04D 27/02
417/15
2011/0052430 A1 * 3/2011 Dehnen ................. F04B 17/044
417/410.1

(Continued)

FOREIGN PATENT DOCUMENTS

| JP | H03-011190 A | 1/1991 |
| JP | 2005-069109 A | 3/2005 |

(Continued)

OTHER PUBLICATIONS

JP200909905 Translation, Kenji, Sep. 2009, JP.*
(Continued)

*Primary Examiner* — Devon C Kramer
*Assistant Examiner* — David N Brandt
(74) *Attorney, Agent, or Firm* — Studebaker & Brackett PC (57) ABSTRACT

A gas compression device (10) is provided with a compressor (16) and a recovery section (20). The recovery section (20) is provided with a recovery passage (22), an auxiliary compressor (24) which is provided in the recovery passage (22), and a recovery tank (26) which is provided in the recovery passage (22). When gas leaks from the main compressor (16), the auxiliary compressor (24) is driven and the leaked gas is compressed. The leaked gas, the pressure of which has been increased by the auxiliary compressor (24), flows into the recovery tank (26) and is stored therein. The gas within the recovery tank (26) is fed to a suction passage (14).

9 Claims, 5 Drawing Sheets (58) Field of Classification Search
CPC ............... F04B 2201/0208; F17C 5/06; F17C 2221/012; F17C 2227/0164; F17C 2227/0185; F17C 2227/0157; F17C 2265/065; F17C 2265/063; F17C 2270/0139; F17C 2205/0332; F17C 2250/0689; F17C 2260/036; Y02E 60/321; F04D 15/0172; F04D 17/14; F04D 1/10

See application file for complete search history.

(56) References Cited

U.S. PATENT DOCUMENTS

| | | | | |
|---|---|---|---|---|
| 2014/0286795 | A1* | 9/2014 | Kamitani | F04B 39/10 417/62 |
| 2016/0084253 | A1* | 3/2016 | Vinther Toft | F04D 1/063 415/145 |
| 2017/0051875 | A1* | 2/2017 | Nagura | F17C 5/06 |

FOREIGN PATENT DOCUMENTS

| | | | | |
|---|---|---|---|---|
| JP | 2005069109 | * | 3/2005 | ............. F02M 21/02 |
| JP | 4754890 | * | 1/2007 | ................ F17C 9/00 |
| JP | 2009-209905 A | | 9/2009 | |
| JP | 2009209905 | * | 9/2009 | ............. F04B 39/00 |
| JP | 2010-513779 A | | 4/2010 | |
| JP | 2011-132876 A | | 7/2011 | |

OTHER PUBLICATIONS

JP4754890 Translation, Akihiro, Jan. 2007, JP.*
JP2005069109 Translation, Toshiaki, Mar. 2005, JP.*
International Search Report issued in PCT/JP2015/066165; dated Sep. 1, 2015.
Written Opinion issued in PCT/JP2015/066165; dated Sep. 1, 2015.

* cited by examiner

GAS COMPRESSION DEVICE

TECHNICAL FIELD

The present invention relates to a gas compression system.

BACKGROUND ART

Conventionally, gas compression systems for compressing gas such as hydrogen gas have been known, as described in Patent Document 1 described below. A gas compression system disclosed in Patent Document 1 is provided with a soundproof cover for reducing noise. The soundproof cover is configured so that hydrogen gas leaked from the gas compression system does not remain in the soundproof cover. Use of the soundproof cover can avoid risks such as explosion of hydrogen gas.

The gas compression system disclosed in Patent Document 1 assumes that the gas leaks, and thus the system has the problem of wasting the leaked gas.

CITATION LIST

Patent Document

Patent Document 1: JP 2011-132876 A

SUMMARY OF THE INVENTION

An object of the present invention is to provide a gas compression system that can use gas without waste.

The present invention provides a gas compression system that includes a compressor for compressing gas supplied from a gas source through an inlet conduit and a recovery section for recovering gas leaked from the compressor, wherein the recovery section includes an auxiliary compressor for compressing the gas leaked from the compressor and a recovery tank for recovering the leaked gas pressurized by the auxiliary compressor, and wherein the system is configured to be able to feed the leaked gas recovered by the recovery tank to the inlet conduit.

DESCRIPTION OF EMBODIMENTS

Now, embodiments for carrying out the present invention will be described in detail with reference to the drawings.

Figure 1:
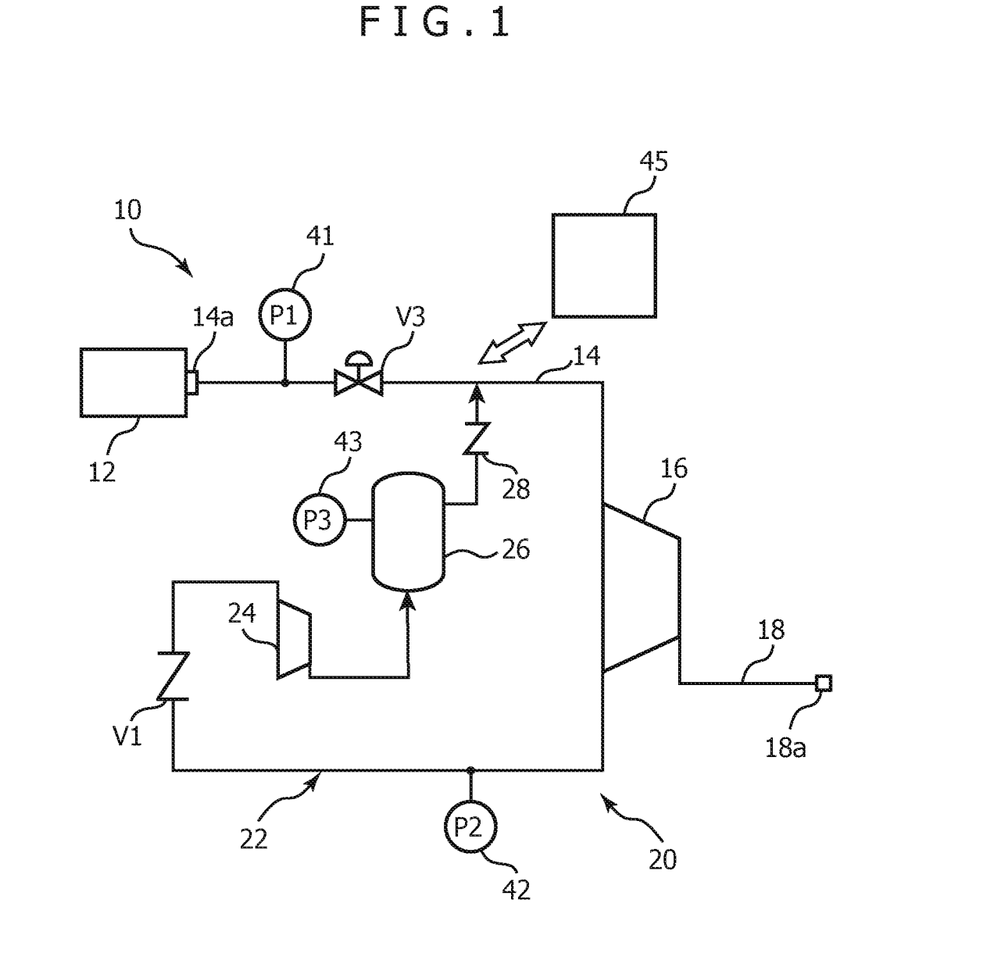
FIG. 1 schematically illustrates a gas compression system according to a first embodiment of the present invention.

As illustrated in FIG. 1, a gas compression system 10 according to an embodiment includes an inlet conduit 14 having an inlet end 14a connectable to a gas source 12; a compressor 16 (hereinafter referred to as "main compressor 16") connected to another end of the inlet conduit 14; a discharge conduit 18 connected to a discharge port of the main compressor 16; a recovery section 20; and a controller (control device) 45. The inlet conduit 14 includes an on-off valve V3 and a first sensor (pressure detector) 41. An outlet end 18a of the discharge conduit 18 is connectable to a device such as a pressure reservoir or a dispenser (not shown). The gas source 12 supplies, for example, hydrogen gas. The gas compression system 10 can be used, for example, in a hydrogen gas station where hydrogen gas is filled into tanks in fuel cell vehicles.

The main compressor 16 is constituted by a reciprocating compressor that includes a piston reciprocating within a cylinder. The piston slides within the cylinder, and thus the gas may leak from a compression chamber separated by the piston within the cylinder (such gas is hereinafter referred to as "leaked gas".). The recovery section 20 is a system for recovering the gas leaked from the main compressor 16.

The recovery section 20 includes a recovery conduit 22, an auxiliary compressor 24 in the recovery conduit 22, a recovery tank 26 in the recovery conduit 22, a valve member V1, a valve member 28, a second sensor (pressure detector) 42, and a third sensor (pressure detector) 43. One end of the recovery conduit 22 (the end in the upstream of the leaked-gas flow) is connected to an outlet for drawing the leaked gas from the main compressor 16. The other end of the recovery conduit 22 (the end in the downstream) is connected to the inlet conduit 14.

The auxiliary compressor 24 compresses the leaked gas. In the embodiment, the auxiliary compressor 24 is a smaller compressor than the main compressor 16 and, in particular, is constituted by a reciprocating compressor that is driven with a hypocycloidal mechanism. The hypocycloidal mechanism includes an outer ring gear (not shown), a planetary gear (not shown) that has a crankshaft inserted therethrough and that is disposed so that the gear runs around the inside of the outer ring gear, and a piston (not shown) that is connected to the planetary gear and is disposed in a cylinder. When the planetary gear runs around the inside of the outer ring gear while engaging with the outer ring gear, the rotation of the crankshaft is converted into a reciprocating motion of the piston.

The recovery tank 26 is disposed on the discharge side (i.e., downstream) of the auxiliary compressor 24 in the recovery conduit 22 and recovers the leaked gas after pressurization by the auxiliary compressor 24.

The valve member V1 is a check valve and is disposed upstream of the auxiliary compressor 24. The valve member V1 allows the leaked gas to only flow from the main compressor 16 into the auxiliary compressor 24 and prevents the leaked gas from flowing back from the auxiliary compressor 24 into the main compressor 16. The valve member 28 is disposed downstream of the recovery tank 26. The valve member 28 allows the leaked gas to only flow from the recovery tank 26 into the inlet conduit 14 and prevents the gas in the inlet conduit 14 from flowing into the recovery tank 26.

The on-off valve V3 in the inlet conduit is disposed between the connection of the inlet conduit 14 to the recovery tank 26 (i.e., the connection of the downstream end of the recovery conduit 22 with the inlet conduit 14) and the gas source 12. The on-off valve V3 in the inlet conduit is normally in an open position.

The first sensor 41, which is a pressure sensor, is disposed upstream of the connection of the inlet conduit 14 to the recovery tank 26 and detects pressure of the gas supplied from the gas source 12 (hereinafter referred to as "supplied gas"). The second sensor 42 is a pressure sensor and is disposed in the recovery conduit 22, between the inlet of the auxiliary compressor 24 and the outlet of the main compressor 16. The second sensor 42 detects pressure of the gas leaked from the main compressor 16. The third sensor 43, which is a pressure sensor, is connected to the recovery tank 26 and detects pressure of the gas in the recovery tank 26. The third sensor 43 does not need to be directly connected to the recovery tank 26, as long as the sensor can detect pressure in the recovery tank 26.

The first sensor 41, the second sensor 42, and the third sensor 43 are connected to the controller 45 so that the sensors and the controller can transmit and receive a signal between them. The controller 45 has a memory, a processing unit, and the like and is configured to execute a program stored in the memory to perform a predetermined function.

When the gas compression system 10 is activated, the controller 45 activates the main compressor 16. The main compressor 16 compresses the gas supplied from the gas source 12 through the inlet conduit 14. The supplied gas after pressurization is discharged into the discharge conduit 18.

While the main compressor 16 is compressing the gas, the controller provides controls for recovering the leaked gas. In particular, the gas may leak while the main compressor 16 is operating, and thus when the leaked gas has a pressure that is equal to or higher than a predetermined pressure (threshold P2$t$), the auxiliary compressor 24 is activated to recover the leaked gas into the recovery tank 26. Then, when pressure in the recovery tank 26 is equal to or higher than a predetermined pressure (threshold P3$t$), the on-off valve V3 in the inlet conduit is closed to force the leaked gas in the recovery tank 26 to return into the inlet conduit 14. Now, recovery of the leaked gas in the gas compression system 10 when the gas leaks from the main compressor 16 will be specifically described with reference to FIG. 2.

Figure 2:
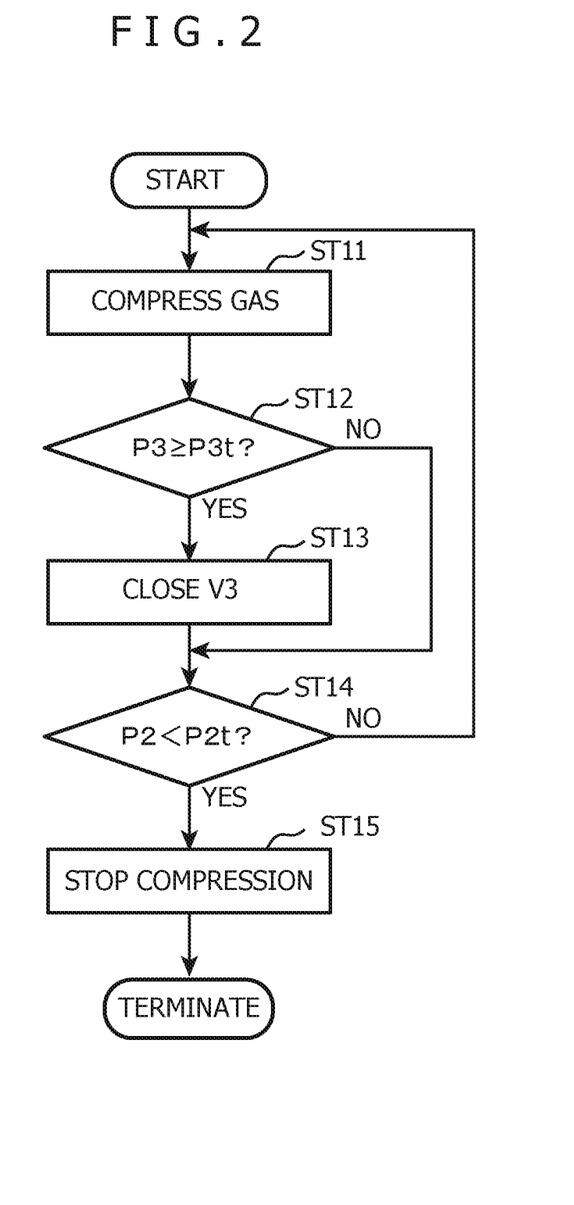
FIG. 2 is a flow diagram illustrating operations by the gas compression system for recovering the leaked gas.

In the control for recovering the leaked gas while the main compressor 16 is operating, first, the controller 45 receives a measurement of pressure of the leaked gas by the second sensor 42. When the controller 45 determines that the pressure P2 of the leaked gas, the pressure being detected by the second sensor 42, is equal to or higher than the threshold P2$t$, the controller 45 provides controls for activating the auxiliary compressor 45. Then, the auxiliary compressor 24 is activated to compress the leaked gas (step S11). In other words, the auxiliary compressor 24 compresses the leaked gas. The drive unit of the auxiliary compressor 24 is inactive until recovery of the leaked gas begins, which reduces wear of components and power consumption of the auxiliary compressor 24.

The leaked gas pressurized by the auxiliary compressor 24 flows into the recovery tank 26, where the gas is stored. When pressure of the leaked gas in the recovery tank 26 is higher than pressure in the inlet conduit 14, the leaked gas flows from the recovery tank 26 into the inlet conduit 14. Thus, the leaked gas in the recovery tank 26 is returned into the inlet conduit 14. The pressure of gas immediately before the gas flows into the main compressor 16 is approximately equal to either pressure of gas supplied from the gas source 12 or pressure of the leaked gas in the recovery tank 26, which is higher. Thus, the power consumption of the main compressor 16 can be reduced, compared with a case in which the leaked gas is not returned to the inlet conduit 14.

When pressure of the leaked gas in the recovery tank 26 is lower than pressure in the inlet conduit 14, the leaked gas remains in the recovery tank 26. In this case, the pressure is increased. Thus, in the gas compression system 10, the controller 45 monitors whether the pressure of the leaked gas is excessive. In particular, the third sensor 43 detects pressure in the recovery tank 26, and when the controller 45 determines that the pressure P3 in the recovery tank 26, the pressure being detected by the third sensor 43, is equal to or higher than the threshold P3$t$ (step S12), the controller 45 forces the on-off valve V3 in the inlet conduit closed (step S13). This results in pressure of the gas in the inlet conduit 14 (more precisely, a region downstream of the on-off valve V3 in the inlet conduit) that is lower than pressure of the leaked gas in the recovery tank 26. Thus, the leaked gas in the recovery tank 26 can be readily returned into the inlet conduit 14.

After a period of time has elapsed since the auxiliary compressor 24 begins to compress the leaked gas, the controller 45 compares pressure P2 of the leaked gas, the pressure being detected by the second sensor 42, with the threshold P2$t$ (step S14). When the detected pressure P2 is lower than the threshold P2$t$ the controller stops compression of the leaked gas by the auxiliary compressor 24 (step S15) to stop recovery of the leaked gas. When the auxiliary compressor 24 stops compression, the drive unit is stopped, which can reduce wear of component wear and power consumption.

When the detected pressure P2 is equal to or higher than the threshold P2$t$ the auxiliary compressor 24 continues to compress the gas (step S11). In this case, when pressure in the recovery tank 26 is higher than pressure in the inlet conduit 14, the leaked gas recovered into the recovery tank 26 is returned into the inlet conduit 14. In contrast, when pressure in the recovery tank 26 is lower than pressure in the inlet conduit 14, the leaked gas remains in the recovery tank 26 without returning into the inlet conduit 14. As described above, when pressure P3 in the recovery tank 26 is equal to or higher than the threshold P3$t$ the on-off valve V3 in the inlet conduit is forced closed (steps S12 and S13). Then, after a period of time has elapsed, pressure P2 of the leaked gas is compared with the threshold P2$t$ (step S14), and when the detected pressure P2 is lower than the threshold P2$t$ the auxiliary compressor 24 stops compression of the leaked gas (step S15). In this manner, the gas compression system 10 continues to recover the leaked gas till the gas leaked from the main compressor 16 is reduced.

As described above, in the first embodiment, the recovery section 20 returns the gas leaked from the main compressor 16 to the inlet of the main compressor 16, and thus the gas can be used without waste.

In the gas compression system 10, closing of the on-off valve V3 in the inlet conduit temporarily stops supply of gas from the gas source 12 to the main compressor 16, and thus the leaked gas in the recovery tank 26 can be reliably returned into the inlet conduit 14. This prevents excessive increase in pressure of the leaked gas in the recovery tank 26. And only when pressure P2 of the leaked gas between the auxiliary compressor 24 and the main compressor 16 is equal to or higher than the threshold P2$t$ the auxiliary compressor 24 compresses the leaked gas, and thus power consumption can be reduced, compared with a case in which the leaked gas is continuously compressed.

The auxiliary compressor 24 is constituted by a reciprocating compressor that is driven with a hypocycloidal mechanism, which can readily downsize the auxiliary compressor 24. Particularly when the compressor is driven with a hypocycloidal mechanism, the drive sound can be lowered.

In the first embodiment, until the auxiliary compressor 24 begins to recover the leaked gas, the auxiliary compressor 24 may be in a standby mode in which the drive unit operates while the compression section does not substantially compress the leaked gas. This can rapidly start compression by the auxiliary compressor 24. When the compression is stopped (step S15), the auxiliary compressor 24 does not need to stop the drive unit and may return to the standby mode as described above. A second embodiment described below has the same configuration.

Figure 3:
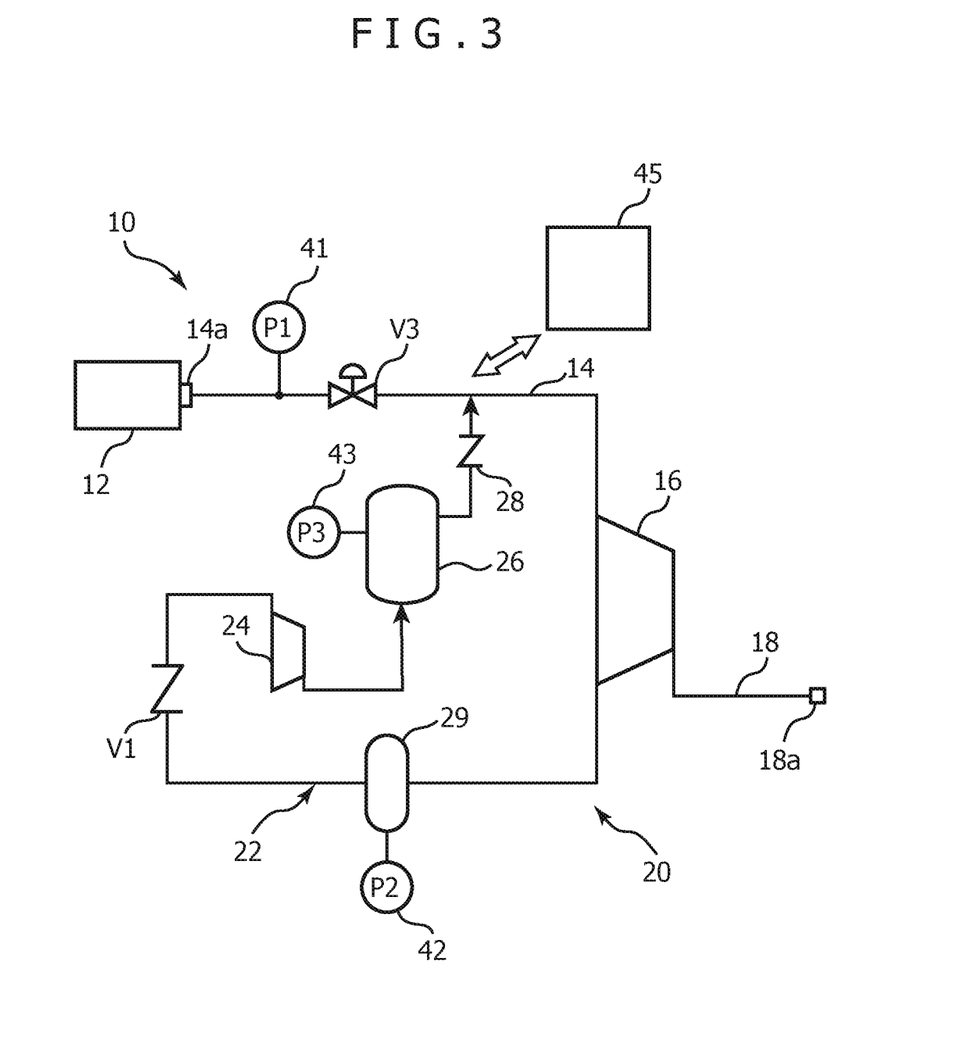
FIG. 3 schematically illustrates the configuration of a gas compression system according to another example.

As illustrated in FIG. 3, the gas compression system 10 may be provided with a buffer tank 29 in the recovery conduit 22 between the outlet of the main compressor 16 and the inlet of the auxiliary compressor 24. The second sensor 42 is attached to the buffer tank 29. The buffer tank 29 temporarily stores the gas leaked from the main compressor 16. Provision of the buffer tank 29 can prevent rapid increase in pressure of the leaked gas in the recovery conduit 22 between the main compressor 16 and the auxiliary compressor 24. The second embodiment described below may be provided with a buffer tank 29 in the same manner as in FIG. 3.

Figure 4:
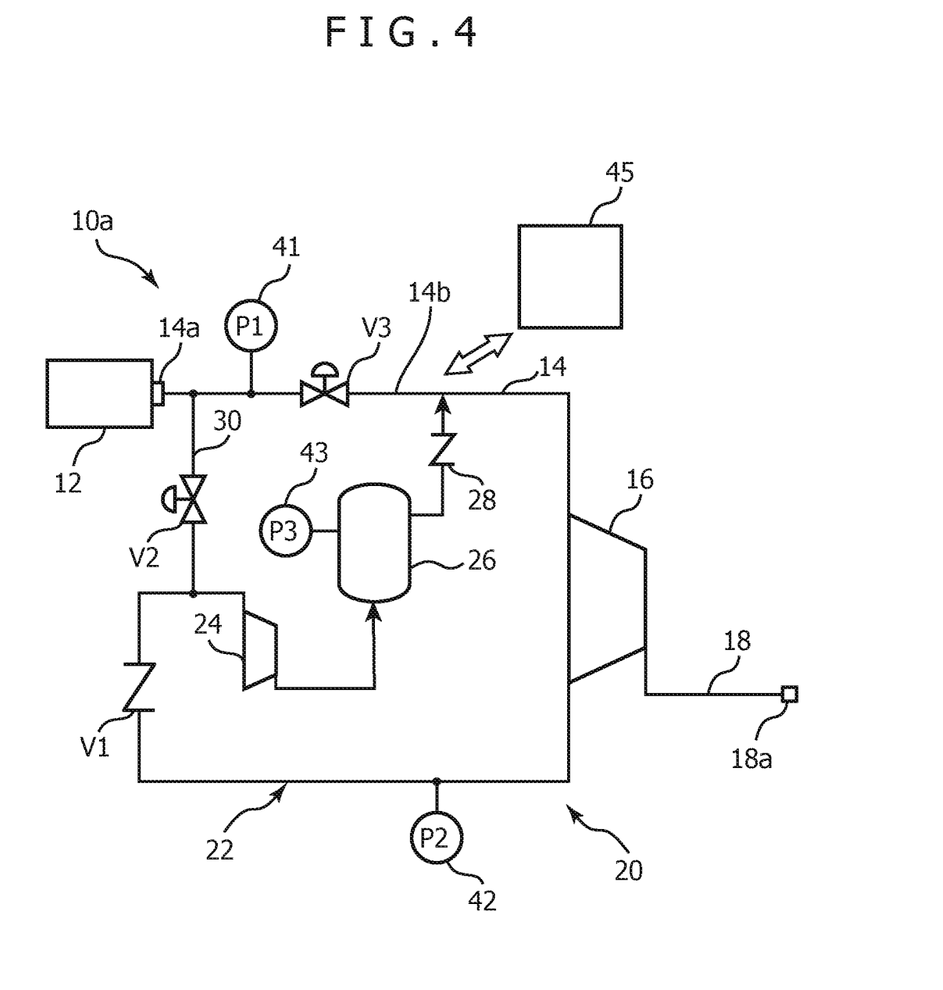
FIG. 4 schematically illustrates the configuration of a gas compression system according to a second embodiment.

FIG. 4 illustrates a gas compression system 10a according to the second embodiment. An inlet conduit 14 includes a main inlet-conduit 14b and a branched conduit 30 extending from the main inlet-conduit 14b. One end of the branched conduit 30 is connected between an inlet of an auxiliary compressor 24 in a recovery conduit 22 and an outlet of a main compressor 16. The other end of the branched conduit 30 is connected between an inlet end 14a in the main inlet-conduit 14b and an on-off valve V3 in the inlet conduit. The branched conduit 30 is provided with an on-off valve (on-off valve V2 in the branched conduit). The on-off valve V2 in the branched conduit is normally in a closed position. Other structures of the gas compression system 10a are similar to those of the gas supply system 10 in the first embodiment. In the following description, similar reference numerals are used to denote components similar to those in the first embodiment. The main compressor 16 operates in a manner similar to the manner in the first embodiment, while when the on-off valve V2 in the branched conduit is in a closed position, the gas supply system 10a recovers the leaked gas in a manner similar to the manner in the first embodiment.

In the gas compression system 10a, pressure of gas supplied from a gas source 12 may be reduced. Thus, in the gas compression system 10a, when pressure of gas in the inlet conduit 14 is lower than a predetermined pressure (threshold P1t), the auxiliary compressor 24 is used to compress gas to be fed to the main compressor 16. Now, pressurization of the supplied gas by the gas compression system 10a will be described with reference to FIG. 5.

Figure 5:
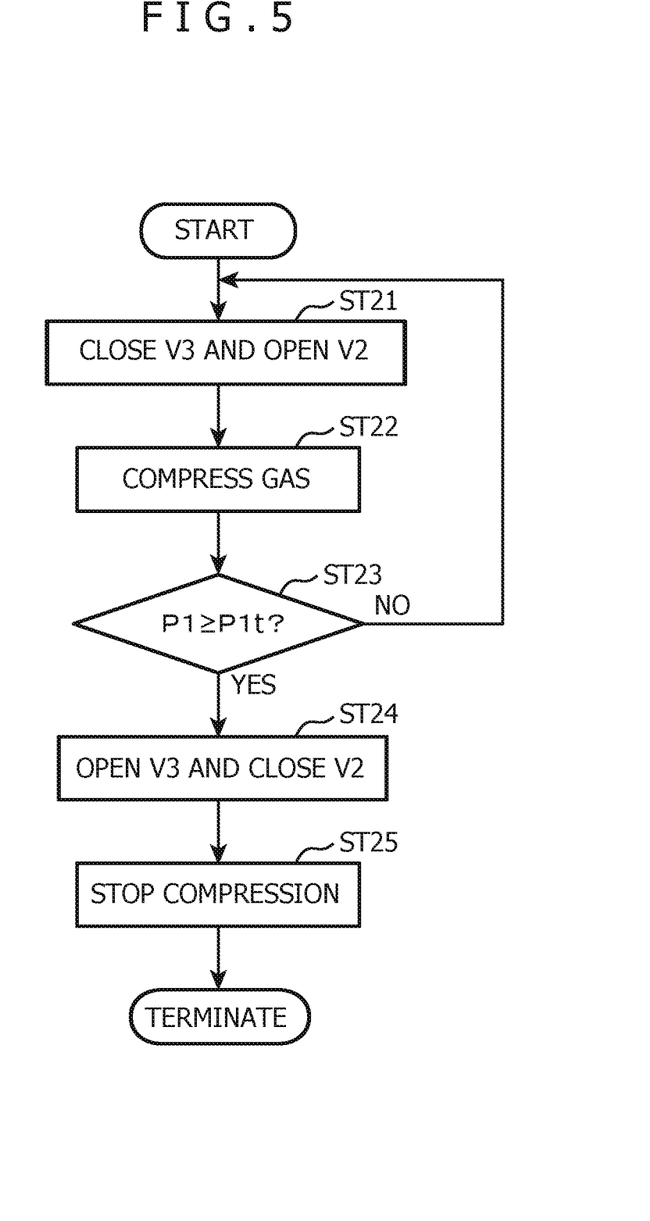
FIG. 5 is a flow diagram illustrating operations for pressurizing gas supplied from the gas source.

First, when a controller 45 determines that pressure of the supplied gas, the pressure being detected by a first sensor 41, is lower than the threshold P1t, the controller 45 provides controls for closing an on-off valve V3 in the feed conduit and opening an on-off valve V2 in the branched conduit (step S21). Next, the controller 45 provides controls for activating the auxiliary compressor 24. This causes the supplied gas to flow through the branched conduit 30 into the auxiliary compressor 24, where the gas is compressed (step S22). The auxiliary compressor 24 may be shifted from a normally standby mode to a mode in which the gas is compressed. The supplied gas after pressurization is returned via a recovery tank 26 into the inlet conduit 14 and then is fed to the main compressor 16.

After a period of time has elapsed since the auxiliary compressor 24 begins to compress the gas, pressure P1 of the supplied gas, the pressure being detected by the first sensor 41, is compared with the threshold P1t (step S23). When the detected pressure P1 is lower than the threshold P1t, the controller 45 maintains the on-off valve V3 in the feed conduit in a closed position and the on-off valve V2 in the branched conduit in an open position. Thus, the auxiliary compressor 24 continues to compress the gas (steps S21 and S22).

After an additional period of time has elapsed, pressure P1 of the supplied gas is again compared with the threshold P1t (step S23), and when the pressure P1 is equal to or higher than the threshold P1t, the controller 45 closes the on-off valve V2 in the branched conduit and opens the on-off valve V3 in the feed conduit (step S24). This causes the supplied gas to flow from the gas source 12, only through the inlet conduit 14, into the main compressor 16. And the auxiliary compressor stops compression (step S25), and the gas compression system 10a terminates pressurization of the supplied gas.

When gas leaks during pressurization of the supplied gas in the gas compression system 10a, the leaked gas, together with the supplied gas, flows into the auxiliary compressor 24. The gas pressurized by the auxiliary compressor 24 is fed via the recovery tank 26 to the main compressor 16. Thus, the gas supply system 10a can recover the leaked gas even when the on-off valve V2 in the branched conduit is in an open position.

In the second embodiment, when pressure P1 of the gas supplied from the gas source 12 is lower than the threshold P1t, the auxiliary compressor 24 can be used to pressurize the supplied gas. In other words, the auxiliary compressor 24 can be used as part of the main compressor 16. This reduces the degree of increase in pressure in the main compressor 16 and prevents excessive load on the main compressor 16, which can also reduce power consumption of the main compressor 16. The upper limit of compression ratio in the main compressor 16 can be lowered, which can downsize the main compressor 16.

In the second embodiment, when a large volume of gas leaks during pressurization of the supplied gas, and then pressure P2 of the leaked gas is equal to or higher than the threshold P2t the controller 45 may close the on-off valve V2 in the branched conduit. This causes the leaked gas to preferentially flow into the auxiliary compressor 24. The leaked gas pressurized by the auxiliary compressor 24 is returned via the recovery tank 26 into the inlet conduit 14.

Although the embodiments of the present invention have been described, the present invention is not limited to the above embodiments, and various changes can be made. For example, while the auxiliary compressor 24 is constituted by a reciprocating compressor that is driven with a hypocycloidal mechanism in the above embodiments, the compressor is not limited thereto. For example, the auxiliary compressor 24 may be constituted by a reciprocating compressor that is driven with a reciprocating motor or a linear motor.

In the above embodiments, the valve member 28 may be an on-off valve in place of a check valve. In this case, the controller 45 provides controls for opening and closing the on-off valve based on values detected by the third sensor 43 and the first sensor 41. The valve member 28 can also be constituted by a check valve and an on-off valve. Similarly, the valve member V1 may be an on-off valve in place of a check valve, and the valve member V1 can be constituted by a check valve and on-off valve. The first sensor 41 may be a flow sensor for detecting the flow rate of the supplied gas. The second sensor 42 may be a flow sensor for detecting the flow rate of the leaked gas.

The auxiliary compressor 24 does not need to be separated from the main compressor 16, and part of the main compressor 16 may function as the auxiliary compressor 24.

In the first embodiment as described above, pressure P2 of the leaked gas may be continuously compared with the threshold P2*t*. In the second embodiment as described above, pressure P1 of the supplied gas may be continuously compared with the threshold P1*t*.

Now, the above embodiments will be summarized.

(1) The gas compression system in the above embodiments includes a compressor for compressing gas supplied from a gas source via an inlet conduit and a recovery section for recovering gas leaked from the compressor. The recovery section includes an auxiliary compressor for compressing the gas leaked from the compressor and a recovery tank for recovering the leaked gas pressurized by the auxiliary compressor, wherein the recovery section is configured so that the leaked gas recovered into the recovery tank can be fed to the inlet conduit.

In the gas compression system, the section for recovering the leaked gas returns the gas leaked from the compressor to the inlet of the compressor, which allows use of the gas without waste.

(2) The gas compression system may further include a control device and a pressure detector for detecting pressure of the leaked gas between the auxiliary compressor and the compressor. In this case, the control device may control the auxiliary compressor so that when a measurement of pressure detected by the first pressure detector is equal to or higher than a threshold, the auxiliary compressor compresses the leaked gas. This aspect can reduce power consumption of the auxiliary compressor.

(3) The gas compression system may further include a control device and a pressure detector for detecting pressure of gas in the gas source. In this case, the inlet conduit may include a branched conduit connected to the inlet of the auxiliary compressor. In this case, the control device may provide controls so that when a measurement of pressure detected by the pressure detector is lower than a threshold, gas in the gas source is provided via the branched conduit to the auxiliary compressor, and then the auxiliary compressor compresses the gas.

In this aspect, when pressure of gas in the gas source is reduced, the gas is introduced into the auxiliary compressor, and then the auxiliary compressor compresses the gas. When the compressed gas has a pressure that is higher than the pressure of gas in the inlet conduit, the gas is returned into the inlet conduit. Thus, the auxiliary compressor can be used to pressurize gas supplied from the gas source. This can prevent excessive load on the compressor even when pressure of gas from the gas source is reduced. This can also reduce power consumption of the compressor.

(4) The gas compression system may further include a control device, a pressure detector for detecting pressure in the recovery tank, an on-off valve between the connection of the inlet conduit to the recovery tank and the gas source. In this case, the control device may provide controls so that when a measurement of pressure detected by the pressure detector is equal to or higher than a threshold, the on-off valve in the inlet conduit is closed.

This aspect can reliably return the leaked gas in the recovery tank to the inlet conduit by closing the on-off valve in the inlet conduit to temporarily stop supplying gas from the gas source. This prevents excessive increase in pressure in the recovery tank.

(5) The gas compression system may further include a buffer tank between the compressor and the inlet of the auxiliary compressor, the tank temporarily storing the leaked gas. This aspect can prevent rapid increase in pressure between the compressor and the auxiliary compressor even when gas leaks from the compressor.

(6) The auxiliary compressor may be either a reciprocating compressor that is driven with a hypocycloidal mechanism or a reciprocating compressor that is driven with a reciprocating motor or a linear motor.

This aspect can downsize the auxiliary compressor when the auxiliary compressor is constituted by the above compressor. Particularly when the auxiliary compressor is driven with a hypocycloidal mechanism, the drive sound can be lowered.

(7) A method for operating the gas compression system in the embodiment includes compressing the leaked gas by the auxiliary compressor when a measurement of pressure of the leaked gas between the auxiliary compressor and the compressor is equal to or higher than a threshold.

(8) When the inlet conduit in the gas compression system includes a branched conduit connected to the inlet of the auxiliary compressor, a method for operating the gas compression system may include compressing, by the auxiliary compressor, gas supplied from the branched conduit and returning the gas into the inlet conduit when a measurement of pressure of gas from the gas source is lower than a threshold.

(9) When the gas compression system further includes an on-off valve between the connection of the inlet conduit to the recovery tank and the gas source, a method for operating the gas compression system may include closing the on-off valve in the inlet conduit to feed the leaked gas from the recovery tank into the inlet conduit.

As described above, gas supplied from the gas source can be used without waste in accordance with the embodiments.

The invention claimed is:

1. A gas compression system comprising
a compressor for compressing gas supplied from a gas source through an inlet conduit; and
a recovery section for recovering gas leaked from the compressor,
wherein the recovery section comprises:
an auxiliary compressor for compressing the gas leaked from the compressor, and
a recovery tank for recovering the leaked gas pressurized by the auxiliary compressor,
wherein the system is configured to be able to feed, into the inlet conduit, the leaked gas recovered by the recovery tank,
wherein the gas compression system further comprises an on-off valve between the connection of the inlet conduit to the recovery tank and the gas source, and
wherein the on-off valve in the inlet conduit is configured to be closed when the leaked gas from the recovery tank is fed to the inlet conduit.

2. The gas compression system according to claim 1, wherein the system further comprises
a control device, and
a pressure detector for detecting pressure of the leaked gas between the auxiliary compressor and the compressor, and
wherein the control device controls the auxiliary compressor so that when a measurement of pressure detected by the pressure detector is equal to or higher than a threshold, the auxiliary compressor compresses the leaked gas.

3. The gas compression system according to claim 1, wherein the system further comprises
a control device, and
a pressure detector for detecting pressure of gas in the gas source, wherein the inlet conduit comprises a branched conduit connected to the inlet of the auxiliary compressor, wherein the control device provides controls so that when a measurement of pressure detected by the pressure detector is lower than a threshold, gas in the gas source is supplied through the branched conduit into the auxiliary compressor, and then the auxiliary compressor compresses the gas.

4. The gas compression system according to claim 1, wherein the system further comprises a control device, and a pressure detector for detecting pressure in the recovery tank, wherein the control device provides controls so that when a measurement of pressure detected by the pressure detector is equal to or higher than a threshold, the on-off valve in the inlet conduit is closed.

5. The gas compression system according to claim 1, wherein the system further comprises a buffer tank between the compressor and the inlet of the auxiliary compressor, the tank temporarily storing the leaked gas.

6. The gas compression system according to claim 1, wherein the auxiliary compressor is either a reciprocating compressor that is driven with a hypocycloidal mechanism or a reciprocating compressor that is driven with a reciprocating motor or a linear motor.

7. A method for operating the gas compression system according to claim 1, wherein when a measurement of pressure of the leaked gas between the auxiliary compressor and the compressor is equal to or higher than a threshold, the auxiliary compressor compresses the leaked gas.

8. A method for operating the gas compression system according to claim 1, wherein the inlet conduit comprises a branched conduit connected to the inlet of the auxiliary compressor, and wherein when a measurement of pressure of gas in the gas source is lower than a threshold, the auxiliary compressor compresses gas supplied from the branched conduit to return the gas into the inlet conduit.

9. A method for operating the gas compression system according to claim 1, wherein the on-off valve in the inlet conduit is closed to feed the leaked gas from the recovery tank to the inlet conduit.

* * * * *